United States Patent
Schöllhorn (10) Patent No.: US 6,424,683 B1
(45) Date of Patent: Jul. 23, 2002

(54) CIRCUIT FOR DEMODULATING TWO-DIMENSIONAL DATA SYMBOLS TRANSMITTED BY A CARRIER-BASED DATA TRANSMISSION

(75) Inventor: Peter Schöllhorn, Holzkirchen (DE)

(73) Assignee: Infineon Technologies AG, Munich (DE)

(*) Notice: Subject to any disclaimer, the term of this patent is extended or adjusted under 35 U.S.C. 154(b) by 0 days.

(21) Appl. No.: 09/625,217

(22) Filed: Jul. 24, 2000

Related U.S. Application Data (63) Continuation of application No. PCT/DE99/00131, filed on Jan. 20, 1999.

(30) Foreign Application Priority Data

Jan. 22, 1998 (DE) .......................... 198 02 373

(51) Int. Cl.$^7$ ................................ H03D 3/22
(52) U.S. Cl. ...................................... 375/332
(58) Field of Search .................. 375/332, 316, 375/324, 261; 455/323, 339, 340

(56) References Cited

U.S. PATENT DOCUMENTS

| | | | |
|---|---|---|---|
| 5,130,802 A | | 7/1992 | Ruprecht et al. |
| 5,557,642 A | * | 9/1996 | Williams .................. 375/316 |
| 5,640,698 A | * | 6/1997 | Shen et al. ................ 455/323 |
| 5,696,796 A | | 12/1997 | Poklemba |
| 6,111,911 A | * | 8/2000 | Sanderford, Jr. et al. ... 375/147 |

FOREIGN PATENT DOCUMENTS

EP 0 629 040 12/1994

OTHER PUBLICATIONS

"Integrated Circuits, Data Sheet, TDA8045, QAM demodulator, Philips", dated Feb. 2, 1996, pp. 1–7.

"IEEE Transactions on Consumer Electronics", dated Aug. 1996, vol. 42, No. 3, ITCEDA (ISSN 0098–3063), pp. 335–338.

(List continued on next page.)

*Primary Examiner*—Chi Pham
*Assistant Examiner*—Khai Tran
(74) *Attorney, Agent, or Firm*—Laurence A. Greenberg; Werner H. Stemer; Ralph E. Locher (57) ABSTRACT

A circuit for demodulating two-dimensional data symbols transmitted by carrier-based data transmission. The circuit has a tuner and a quadrature demodulator. The tuner has a first intermediate frequency stage for converting a carrier frequency of an input signal containing the two-dimensional data symbols to a first intermediate frequency f1, a surface wave filter, and a second intermediate frequency stage connected downstream of the surface wave filter for converting the carrier frequency of the input signal to a second intermediate frequency f2. The second intermediate frequency f2 is lower than the first intermediate frequency f1. The demodulator converts the input signal at the second carrier intermediate frequency f2 to a baseband and splits it into in-phase and quadrature components. The quadrature demodulator contains an A/D converter with a prescribed sampling frequency fa, and an anti-alias filter is connected upstream of the A/D converter in order to remove interfering spectral components from the useful signal. The following relationship between the first and second intermediate frequencies f1, f2 and the sampling frequency fa are defined by the equations:

$f2=f1/5$ and $fa=4 \cdot f2$ or $fa=4/5 \cdot f1$.

12 Claims, 10 Drawing Sheets

OTHER PUBLICATIONS

"Architektur eines Mobilfunkgerätes für das Netz D" (Schöffel et al.), dated Jan. 1991, Phillips Innovation, pp. 7–14, pertains to the architecture of a mobile radio communications device for the net D.

"Digitale Fersehtechnik, Datenkompression und Übertragung für DVB" (Reimers), dated 1997, pp. 210–220 and 270–272, pertains to digital television engineering.

"Preliminary Data Sheet U2757M–C", Semiconductor, TEMIC, dated Feb. 1997, pp. 21–23.

"Semiconductor Short Form 1997, TEMIC Semiconductors", pp. 13–14.

"JESSI AE14 DAB Verbundprojekt, Implementation of Prototype Building Blocks for DAB Standard" dated Dec. 1995, pp. 8–12.

* cited by examiner

CIRCUIT FOR DEMODULATING TWO-DIMENSIONAL DATA SYMBOLS TRANSMITTED BY A CARRIER-BASED DATA TRANSMISSION

CROSS-REFERENCE TO RELATED APPLICATION

This is a continuation of copending International Application PCT/DE99/00131, filed Jan. 20, 1999, which designated the United States.

BACKGROUND OF THE INVENTION

Field of the Invention

The invention relates to a circuit for demodulating two-dimensional data symbols transmitted by carrier-based data transmissions.

The invention applies to the field of demodulating two-dimensional data symbols and thus concerns virtually all modern methods relating to carrier-based data transmission or data transmission on the basis of a carrier frequency (DVB-T, DVB-S, DVB-C, DAB, ADSL, etc.). Nowadays, it is usual to carry out demodulation using digital signal processing.

SUMMARY OF THE INVENTION

It is accordingly an object of the invention to provide a circuit for demodulating two-dimensional data symbols transmitted by a carrier-based data transmission that overcomes the disadvantages of the prior art devices of this general type, which permits the sampling frequency of a analog/digital converter to be selectable independently of the symbol rate and which ensures that interfering spectral components in the output signal from the tuner are not convolved into the useful band as a result of sampling. Hence, simple measures in the digital quadrature demodulator are intended to ensure that DC components at the output of the analog/digital converter do not impair demodulation.

With the foregoing and other objects in view there is provided, in accordance with the invention, a circuit for demodulating two-dimensional data symbols transmitted by a carrier-based data transmission. The circuit has a tuner with a first intermediate frequency stage for converting a carrier frequency of a reception-side input signal containing the two-dimensional data symbols to a first intermediate frequency f1. A surface wave filter is connected downstream of the first intermediate frequency stage. A second intermediate frequency stage for converting the carrier frequency of the input signal to a second intermediate frequency f2 being lower than the first intermediate frequency f1 is provided and is connected downstream of the surface wave filter. A quadrature demodulator is connected downstream of the tuner and converts the input signal at the second carrier intermediate frequency f2 to a baseband and splits it into in-phase and quadrature components. The quadrature demodulator has an A/D converter with a prescribed sampling frequency fa and an anti-alias filter is connected upstream of the A/D converter for removing interfering spectral components. The first intermediate frequency f1, the second intermediate frequencie f2 and the sampling frequency fa being approximately defined by one of the following equations: f2=f1/5 and fa=4·f2; f2=f1/5 and fa=4/5·f1; fa=4/5·f1; or fa=6/5·f1.

Accordingly, the invention is able to overcome the aforementioned problems elegantly, i.e. in a surprisingly simple manner, by suitably stipulating the intermediate and sampling frequencies.

In other words, the invention is based on recognition of a mathematical correlation indicating how the sampling frequency of the digital quadrature demodulator and the intermediate frequency/frequencies of the tuner needs/need to be selected in order to change the alias components. The alias components are changed by sampling the oscillator crosstalk which can arise in the second stage of the tuner, to a particular frequency independently of the symbol rate of the data signal. This particular frequency is intended to ensure that the interference signal can be suppressed in the digital quadrature demodulator using simple measures. The DC component at the output of the analog/digital converter is then automatically rendered harmless.

The latter effect is also effective for receiver configured using direct sampling of a single intermediate frequency of the tuner.

In accordance with an added feature of the invention, the anti-alias filter is a filter selected from the group consisting of low-pass filters and bandpass filters.

In accordance with an additional feature of the invention, the quadrature demodulator has a removal device for removing a frequency fa/4 and is connected downstream of the A/D converter.

In accordance with another feature of the invention, the removal device has a mixer low-pass filter configuration with a frequency trap at fa/4.

In accordance with another added feature of the invention, the removal device has a mixer low-pass filter configuration with a zero.

In accordance with a concomitant feature of the invention, the quadrature demodulator has a mixer low-pass filter configuration connected downstream of the A/D converter and a sampling rate converter with a low-pass filter connected downstream of the mixer low-pass filter configuration.

Other features which are considered as characteristic for the invention are set forth in the appended claims.

Although the invention is illustrated and described herein as embodied in a circuit for demodulating two-dimensional data symbols transmitted by a carrier-based data transmission, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIGS. 8A to 8D are sixth frequency/amplitude graphs for the signal spectra at various measurement points in the tuner having a single intermediate frequency stage and in the quadrature demodulator shown in FIGS. 12 and 13 for intermediate frequencies and sampling frequencies stipulated according to the invention, where

FIGS. 9A and 9B are frequency/amplitude graphs for the signal spectra at various measurement points in the tuner and in the quadrature demodulator shown in FIGS. 12 and 13 for the intermediate frequencies and the sampling frequencies stipulated according to the invention, where

DESCRIPTION OF THE PREFERRED EMBODIMENTS

In all the figures of the drawing, sub-features and integral parts that correspond to one another bear the same reference symbol in each case. Referring now to the figures of the drawing in detail and first, particularly, to FIG. 1 thereof, there is shown a known structure of a tuner for receiving carrier-based signals at a carrier frequency fm. The signals are fed into a tuner at an input 1 using an antenna, for example, or via a cable connection. The tuner contains two intermediate frequency stages 2 and 3: the first intermediate frequency stage 2 converts the signal to a first intermediate frequency f1 so that a desired channel can be filtered out using a steep-edged surface wave filter 4 connected downstream of the first intermediate frequency stage 2. Adjacent channels are heavily suppressed in the process. The second intermediate frequency stage 3, which follows the filter 4, converts the signal to a further, lower intermediate frequency f2 so that the signal can be digitized using an analog/digital converter. For both intermediate frequency conversions, two mixer frequencies each can be selected in principle, namely a mixer frequency based on a summation: input carrier frequency+output carrier frequency, and a mixer frequency based on a subtraction: input carrier frequency−output carrier frequency.

Figure 1:
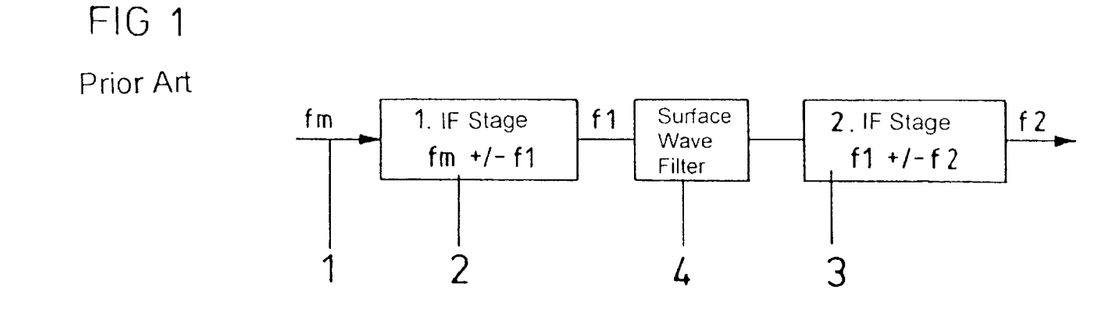
FIG. 1 is a block diagram of an embodiment of a tuner having two intermediate frequency stages in a known circuit for demodulating two-dimensional data symbols transmitted by carrier-based data transmission.
Figure 2:
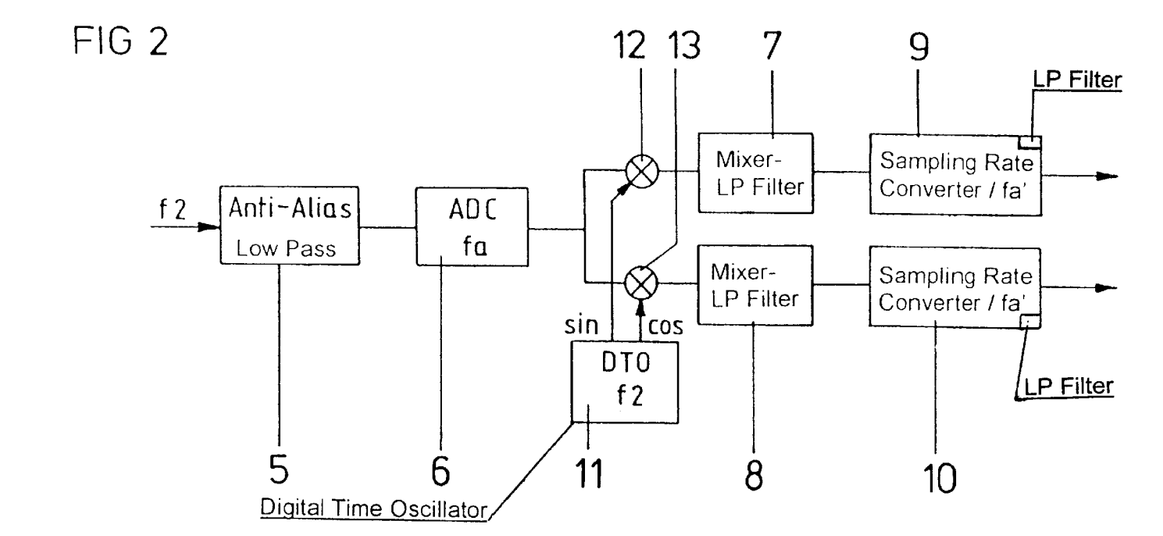
FIG. 2 is a block diagram of an embodiment of a digital quadrature demodulator in a circuit, receiving signals from the tuner shown in FIG. 1, for demodulating two-dimensional data symbols transmitted by the carrier-based data transmission.

FIG. 2 shows the structure of a digital quadrature demodulator whose task is to convert the input signal received by the tuner in FIG. 1, at the carrier frequency f2, to the baseband and also to split the signal into the in-phase and quadrature components at the same time. Normally, an analog anti-alias filter 5 is used first to suppress all interfering spectral components which could be convolved into the useful band as a result of sampling. The output signal from mixer modules, such as are used for inexpensive consumer goods, for example in the second intermediate frequency stage 3 of the tuner in the field of entertainment electronics, contains interfering components which greatly increase the circuit complexity for the anti-alias filter 5. The component with the highest level of interference is produced here by crosstalk from the oscillator signal at the frequency f1−f2 or f1+f2.

The filter 5 in the quadrature demodulator is followed by an A/D converter 6 operated at a predetermined sampling frequency fa. The A/D converter 6 is followed by two mixer low-pass filters 7, 8 connected in parallel and two sampling rate converters 9, 10, which are likewise connected in parallel and are operated at a frequency fa'. Multiplication stages 12, 13 are connected between the A/D converter 6 and the two mixer low-pass filters 7, 8 and are controlled by a digital time oscillator (DTO) circuit 11 operating at the frequency f2 to form a quadrature mixer.

After sampling in the A/D converter 6, the input signal is split into the two in-phase and quadrature component signals using the quadrature mixer, which contains the components 11, 12, 13, and these signals are supplied to the mixer low-pass filters 7 and 8, respectively. The digital mixer low-pass filters 7, 8 suppress the signals at the summed frequency that have been produced during mixing. The two synchronously operating sampling rate converters 9, 10 convert the signals to a virtual sampling frequency fa' which is synchronous with the sampling rate fa contained in the received signal.

Figure 3A:
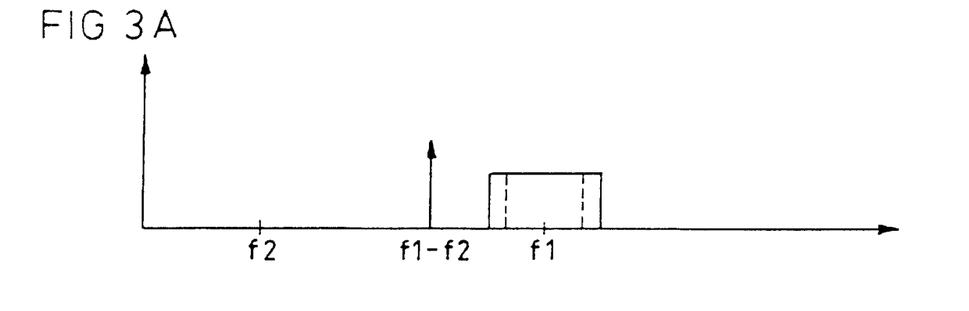
FIGS. 3A to 3D are first frequency/amplitude graphs for signal spectra at various measurement points in the tuner and in the quadrature demodulator shown in FIGS. 1 and 2 for conventionally selected intermediate frequencies and sampling frequencies.
Figure 3B:
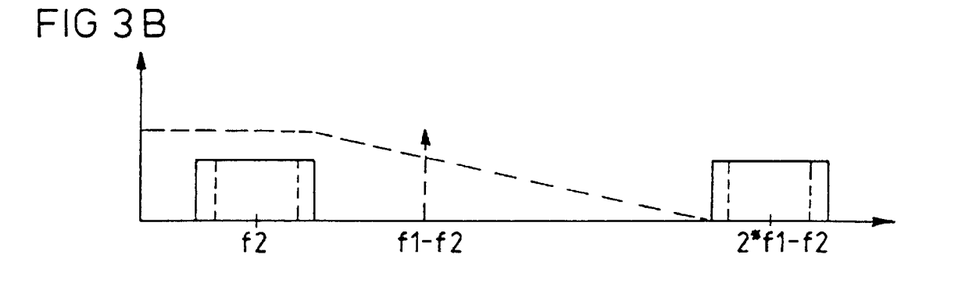
Figure 3C:
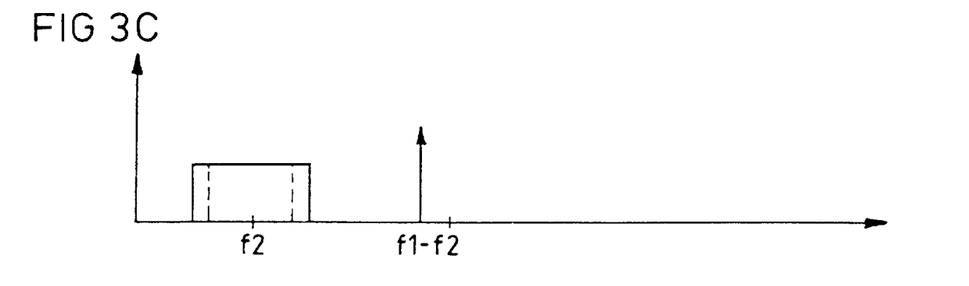
Figure 3D:
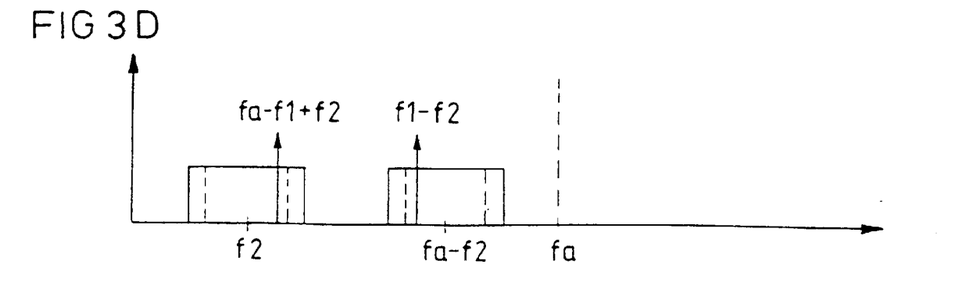

FIGS. 3A to 3D and 4A to 4D schematically show the signal spectra at various points in the circuit containing the tuner and the quadrature demodulator shown in FIGS. 1 and 2. FIG. 3A shows the spectrum at the mixer frequency f1−f2 at the output of the second intermediate frequency stage 3. FIG. 3B shows the output spectrum after mixing at the mixer frequency f1−f2. FIG. 3C shows the output spectrum of the mixer with oscillator crosstalk, where the summed terms are assumed to be suppressed, and FIG. 3D shows the spectrum after sampling at the frequency fa. FIGS. 3A to 3D differ from FIGS. 4A to 4D only through different mixer frequencies, which is why only FIGS. 3A to 3D are explained in detail below for the sake of simplicity.

Figure 4A:
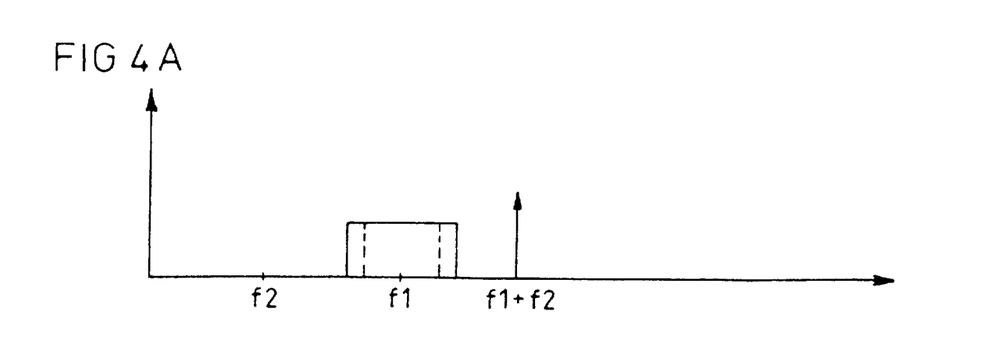
FIGS. 4A to 4D are second frequency/amplitude graphs for the signal spectra at various measurement points in the tuner and in the quadrature demodulator shown in FIGS. 1 and 2 for the conventionally selected intermediate frequencies and the sampling frequencies which are different from those shown in FIGS. 3A to 3D.
Figure 4B:
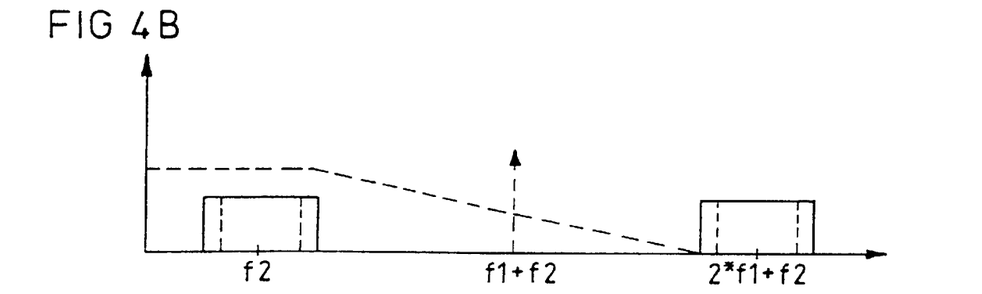
Figure 4C:
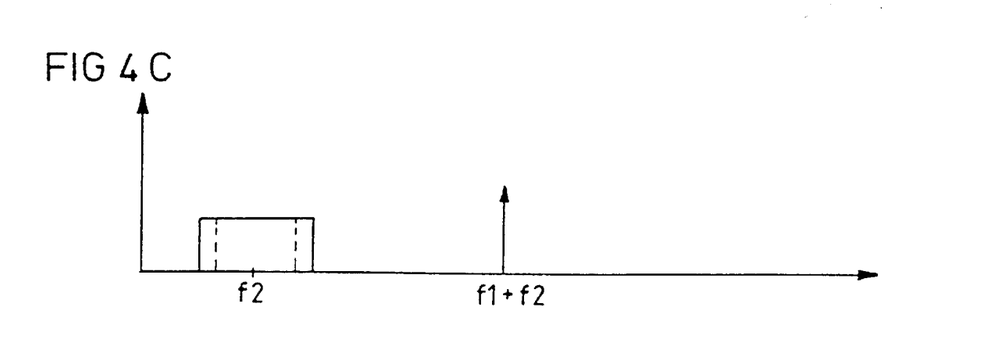
Figure 4D:
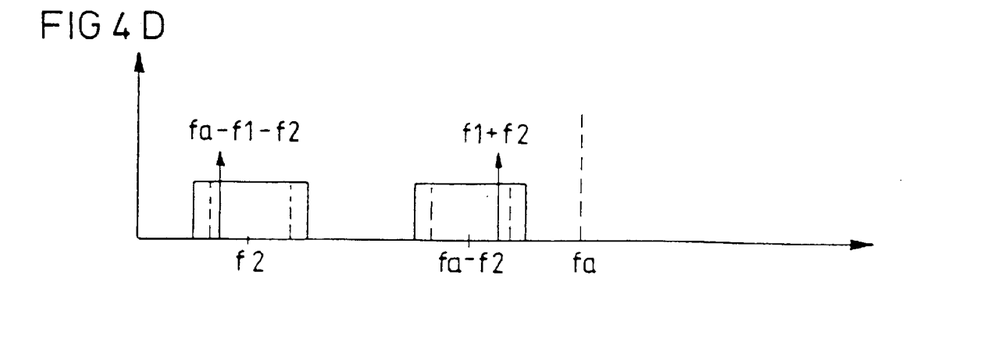

FIG. 3A shows the spectrum of the signal at the input of the second intermediate frequency stage 3 and the position of the oscillator frequency. FIG. 32 shows the spectrum after mixing. The filter function of the anti-alias filter 5 is shown in dashed lines in FIG. 3B. The summed term 2·f1−f2 (i.e. 2·f1+f2 in FIG. 4B) needs to be suppressed by the anti-alias filter 5. If the aforementioned crosstalk now also results in a spectral line at the frequency f1−f2 (i.e. f1+f2 in FIG. 4B), the anti-alias filter 5 generally needs to suppress this spectral line as well, which results in greatly increased circuit complexity. If the spectral line suppression does not take place, this component is generally convolved into the useful band during sampling, as shown by FIGS. 3D and 4D, and the reception quality is significantly impaired.

The following problems arise during operation of the circuit explained above:

a). The frequencies f1 and f2 of the intermediate frequency stages 2, 3 and the sampling frequency fa of the quadrature demodulator need to be selected such that the interfering spectral line is not in the useful band after sampling and can thus be rendered harmless using digital filters. In this context, selection of the frequencies is restricted by the fact that the frequency f1 is firmly prescribed in numerous application instances.

b). It must be possible to process the two mixer frequencies f1−f2 and f1+f2 using one and the same circuit.

c). The demands on the mixer low-pass filters 7, 8 must be minimized, i.e. the transition region between the passband and the stop band should be as large as possible.

d). It must be possible to process various signal bandwidths without changing the frequencies f1, f2 and fa. In FIGS. 3A–3D and 4A–4D, the largest bandwidth in each case is shown using solid lines, and smaller bandwidths are indicated by dashed lines.

To solve these problems, the proposal for the case of a DVB-T receiver is that external VCXOs be used in order to provide a sampling frequency that is synchronous with the data rate. However, this measure solves the aforementioned problem only in part.

In terms of the oscillator crosstalk, the anti-alias filter 5 bears the full load. The circuit complexity for the mixer low-pass filter 7 or 8 can be reduced by clever selection of the intermediate frequency f2. However, this optimization can be carried out only for one symbol rate in each case.

For a second rate, both the sampling rate and the frequency f2 need to be switched over, which requires two quartz oscillators per sampling rate.

In addition, there are already solutions which permit arbitrary selection of the sampling frequency and use numerical methods to produce a data stream at a sampling rate which is synchronized to the sampling rate of the transmitter (sampling rate conversion, virtual sampling). However, it is assumed here that interference components in the analog input signal are fully suppressed by analog anti-alias filters upstream of the analog/digital converter.

These analog filters are—particularly when they are to be integrated on a CMOS IC—associated with large manufacturing tolerances. In particular, steep filter edges and low, accurate-frequency transmission zeros (so-called traps) require a high level of implementation complexity, which makes integration much more difficult. Associated problems are tuning, noise and nonlinear distortions.

Although theoretically possible, tuners based on a single intermediate frequency stage have not been produced hitherto owing to lack of suitable analog/digital converters. However, on account of the great simplification as compared with a conventional tuner having two intermediate frequency stages, there is essentially a great demand for such a simpler circuit without having to accept impairments in the demodulation, which have had to be expected to date on account of DC components at the output of the analog/digital converter.

In the case of the circuit of the type shown in FIGS. 1 and 2, the problems mentioned can be solved by suitable selection of the frequencies f1, f2 and fa as follows:

$$f2 = f1/5$$

$$fa = 4*f2 \text{ or } fa = 4/5*f1,$$

where f1 is the intermediate frequency from the first intermediate frequency stage 2, f2 is the intermediate frequency from the second intermediate frequency stage 3 and fa is the sampling frequency of the analog/digital converter 6.

The selection of the intermediate frequencies f1, f2 for the tuner and of the sampling frequency fa for the analog/digital converter 6 in the digital quadrature demodulator convolves or pushes the particularly troublesome interference component at the frequency f1−f2 or f1+f2, which stems from the crosstalk of the oscillator in the second intermediate frequency stage 3, into the center of the transition region of the mixer low-pass filter 7, 8.

Figure 5A:
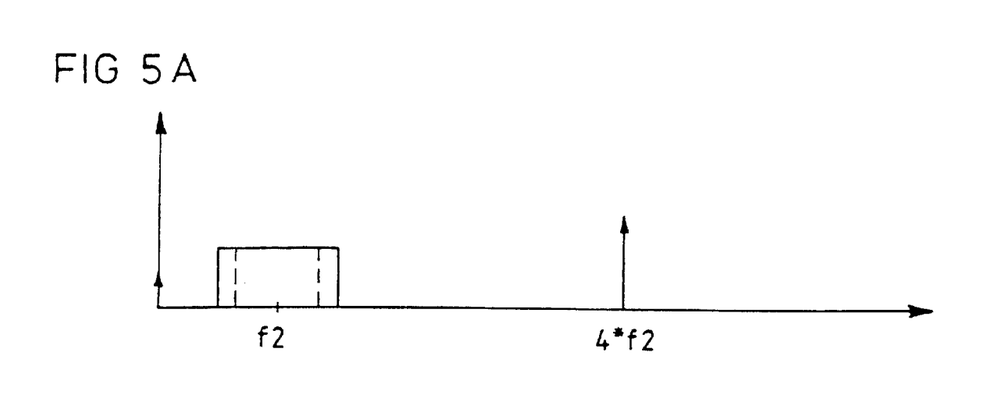
FIGS. 5A to 5C are third frequency/amplitude graphs for the signal spectra at various measurement points in the tuner and in the quadrature demodulator shown in FIGS. 1 and 2 for first intermediate frequencies and sampling frequencies stipulated according to the invention.
Figure 5B:
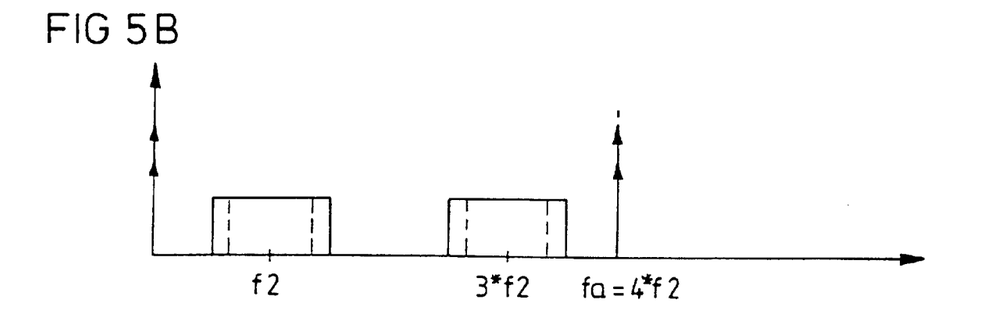
Figure 5C:
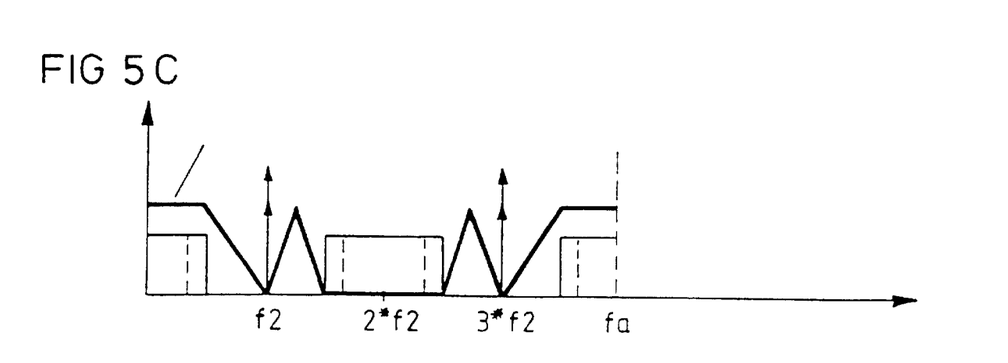
Figure 6A:
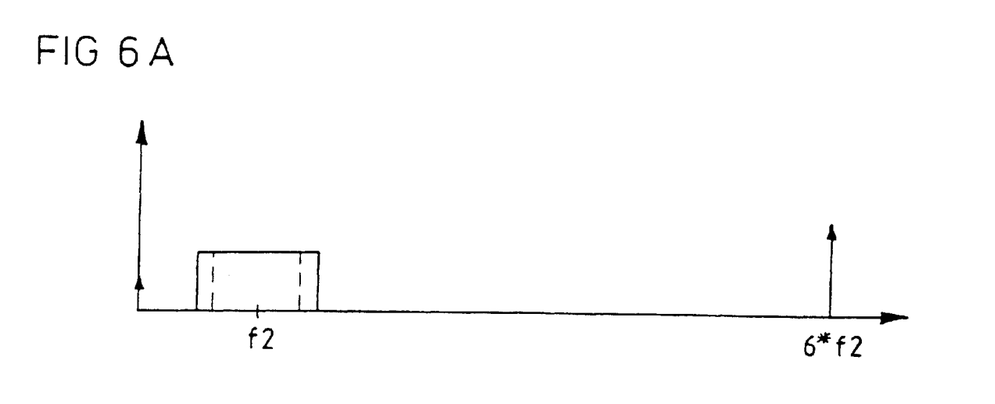
FIGS. 6A to 6C are fourth frequency/amplitude graphs for signals at various measurement points in the tuner and in the quadrature demodulator shown in FIGS. 1 and 2 for second intermediate frequencies and sampling frequencies stipulated according to the invention.
Figure 6B:
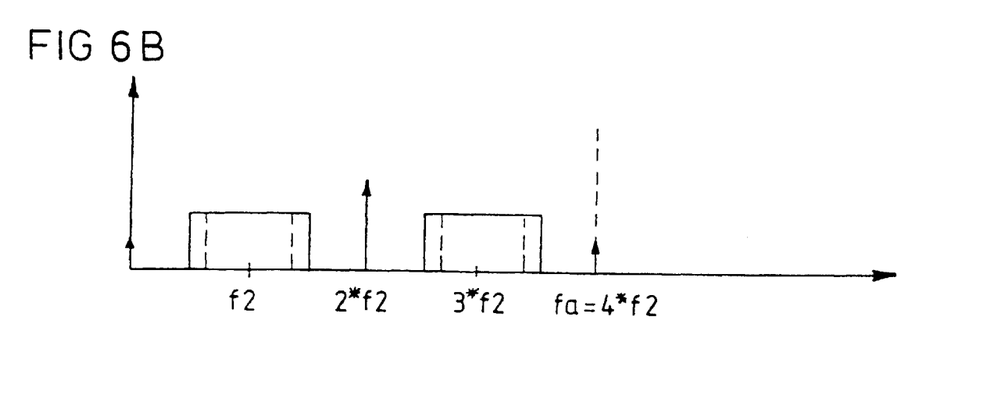
Figure 6C:
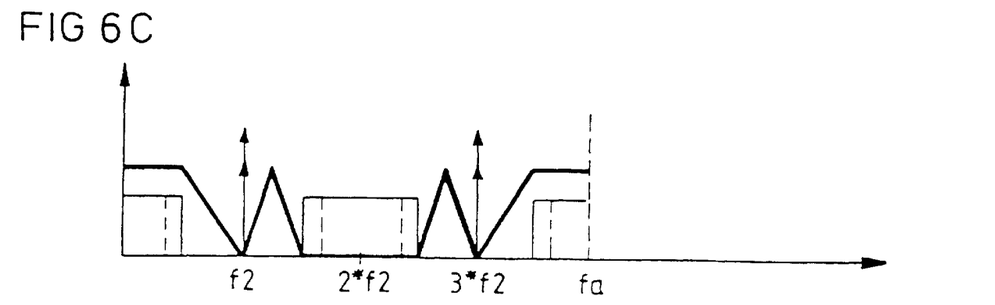

FIGS. 5 and 6 show this in detail. FIG. 5A shows the spectrum after mixing at f1−f2=4*f2 (f2=f1/5) with oscillator crosstalk. FIG. 5B shows the spectrum after sampling at fa=4*f2 and FIG. 5C shows the spectrum after quadrature mixing at f2. FIG. 6A shows the spectrum after mixing at f1+f2=6*f2 (f2=f1/5) with oscillator crosstalk. FIG. 6B shows the spectrum after sampling at fa=4*f2 and FIG. 6C shows the spectrum after quadrature mixing at f2.

Figure 11:
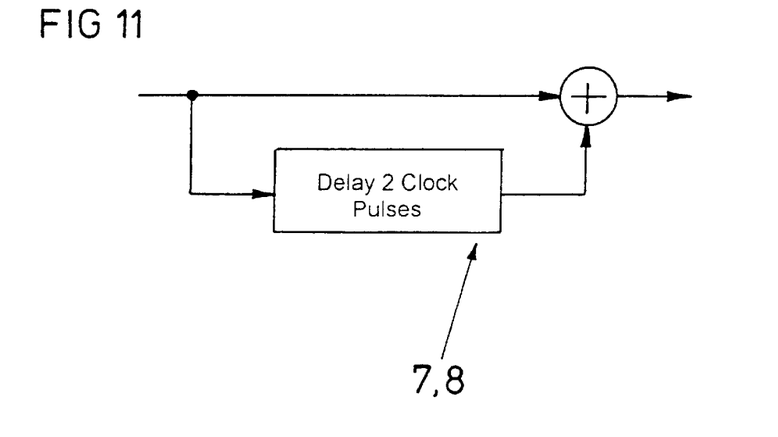
FIG. 11 is a block diagram of a preferred embodiment of a low-pass filter trap at the frequency fa/4 in the digital quadrature demodulator shown in FIGS. 2 and 13 according to the invention.

In the first case, it holds that: f1−f2=4*f2=fa, i.e. the interference component is convolved during sampling after f=0. In the second case, it holds that: f1+f2=6*f2=fa+2*f2, i.e. the interference component is convolved after f=2*f2=fa/2. After quadrature mixing, the interference component is thus exactly a quarter of the sampling frequency and can be suppressed, by way of example, by a very simple filter having the characteristic $1+z^{-2}$. FIG. 11 shows the associated circuit.

Figure 7A:
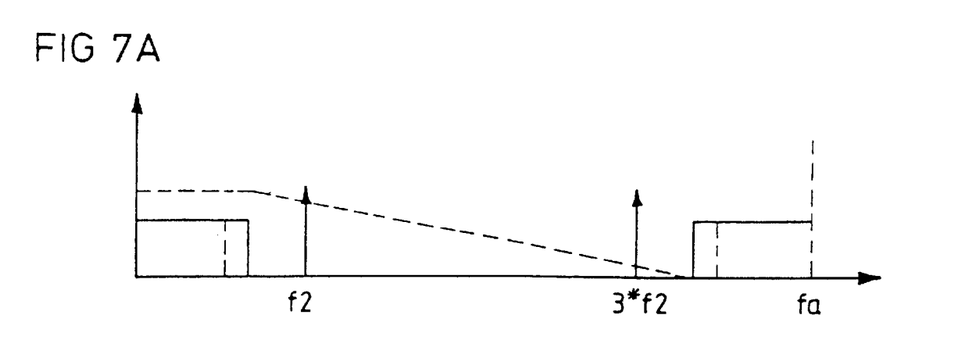
FIGS. 7A and 7B are fifth frequency/amplitude graphs for the signal spectra at various measurement points in the tuner and in the quadrature demodulator shown in FIGS. 1 and 2 for third intermediate frequencies and sampling frequencies stipulated according to the invention.
Figure 7B:
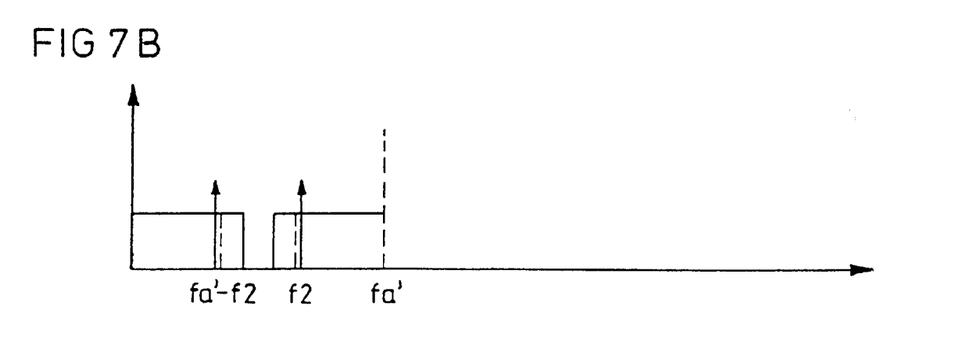
Figure 8A:
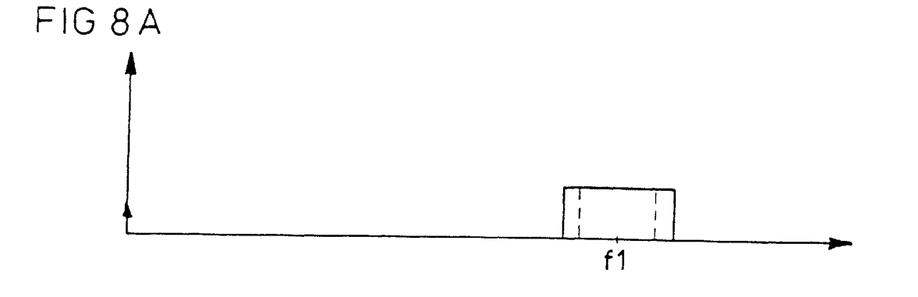
FIG. 8A shows the spectrum after the intermediate frequency stage.
Figure 8B:
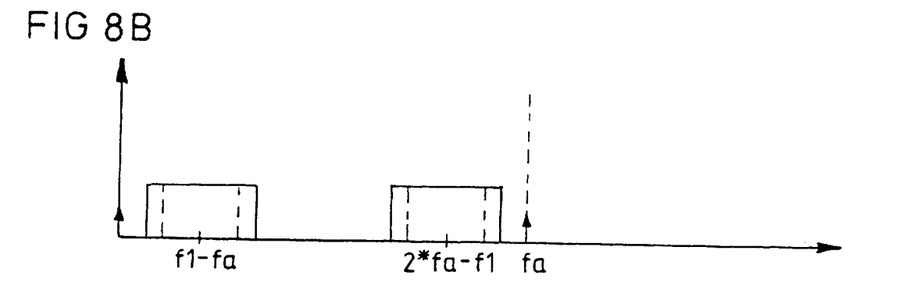
FIG. 8B shows the spectrum after direct sampling at fa<f1.
Figure 8C:
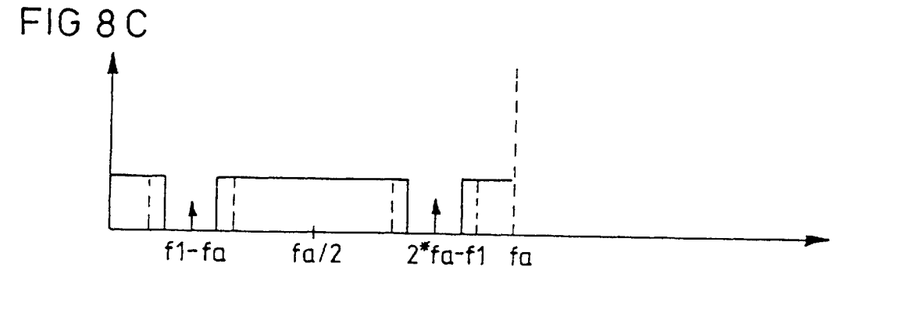
FIG. 8C shows the spectrum after quadrature mixing and FIG. 8D shows the spectrum after sampling rate conversion (fa'<fa/2)
Figure 8D:
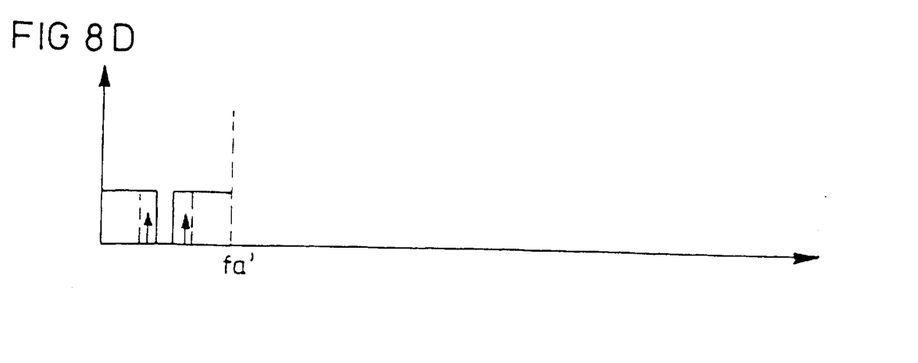

FIG. 7A shows the spectrum after quadrature mixing at f2 when the summed terms are assumed to be suppressed, and FIG. 7B shows the spectrum after sampling rate conversion (fa'<fa/2)) shows that the component is generally convolved into the useful band during sampling rate conversion without prior filtering, since the associated decimation low-pass filter is configured such that it suppresses the repeat spectra at the multiples of the sampling frequency fa. The component at f2=fa/4 then undergoes no noticeable attenuation. The mixer low-pass filter 7, 8, which can be in the form of an FIR or IIR filter, depending on the application, then needs to be configured such that it compensates for the attenuation caused by the frequency trap in the passband. This is possible without any or with a very low level of additional complexity (see FIG. 13). It is also possible to integrate the zero into the low-pass filter circuit by increasing the filter order by two (FIG. 11) or to combine the mixer low-pass filter with the low-pass filter in the sampling rate converter. The latter variant was chosen for the aforementioned processor for DVB-T. Hence, problems a) and b), previously mentioned, are overcome.

The described choice of frequencies produces at the output of the digital quadrature mixer a spectrum in which the useful components and the unwanted mixer products are evenly distributed: the two spectral components have the same width and the distance between the components is at a maximum. Hence, problem c), previously mentioned, is overcome.

Since the sampling frequency of the circuit blocks up to the output of the mixer low-pass filters 7, 8 does not need to be matched to the symbol rate, all the aforementioned properties remain independent of the symbol rate. Hence, problem d) previously mentioned is solved.

A DC component contained in the output signal from the analog/digital converter can be convolved into the useful band after the sampling rate conversion as a result of an unfavorable choice of intermediate frequencies and of the sampling frequency (see FIG. 7), i.e. it needs to be filtered out additionally.

In the case of one dimensional configuration in accordance with the present invention, the quadrature mixing shifts the DC component to the very same point at which the interference signal described above is also situated (f2=fa/4), i.e. the spectral line stemming from the DC component is likewise eliminated without any further complexity.

Figure 9A:
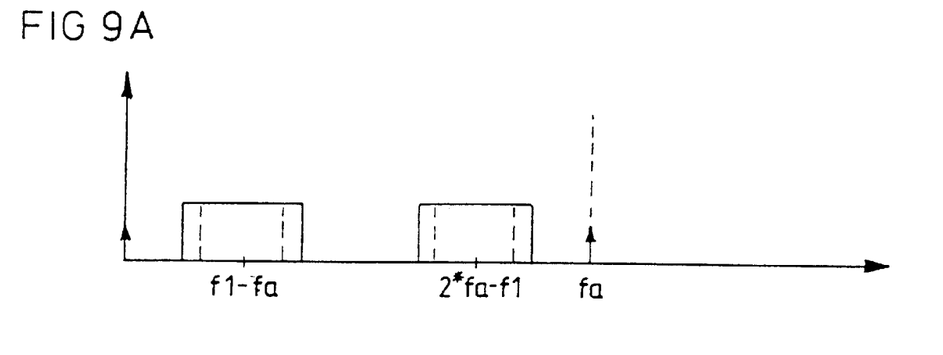
FIG. 9A shows the spectrum after direct sampling at fa=4/5*f1 and fa=6/5*fa.
Figure 9B:
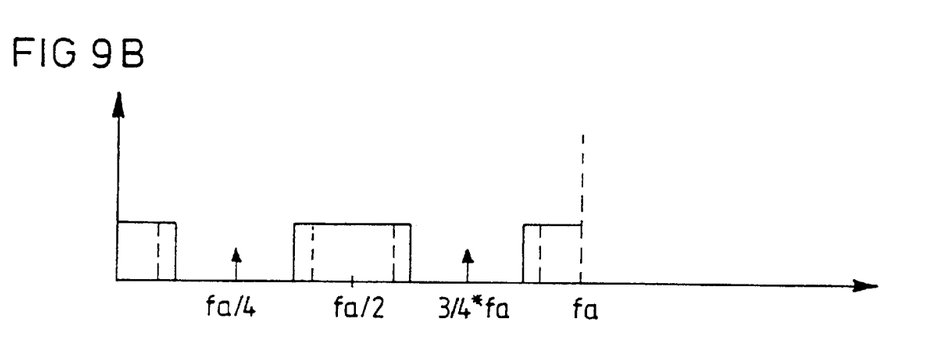
FIG. 9B shows the spectrum after quadrature mixing.
Figure 10:
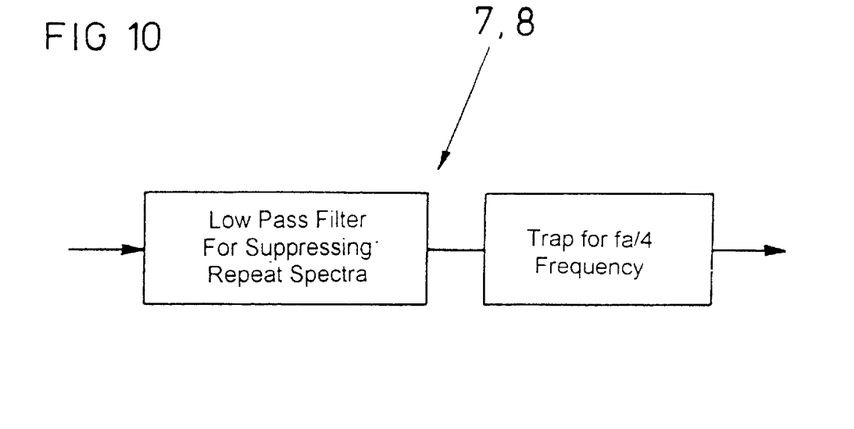
FIG. 10 is a block diagram of a preferred embodiment of a mixer low-pass filter in the digital quadrature demodulator shown in FIGS. 2 and 13 according to the invention.
Figure 12:
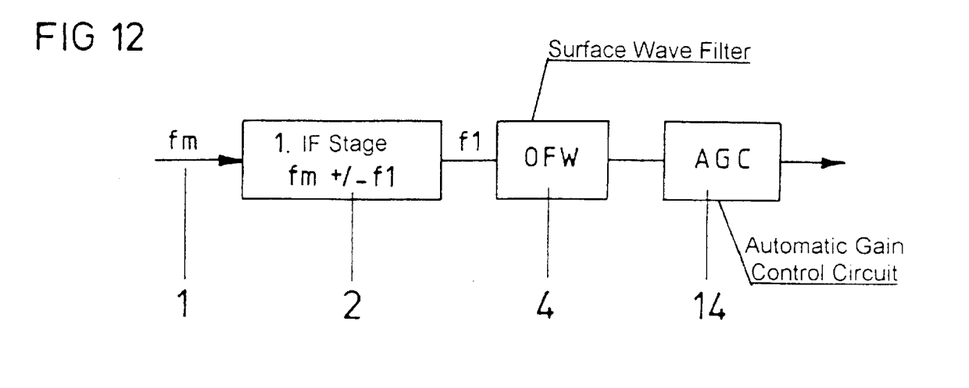
FIG. 12 is a block diagram of an embodiment of the tuner having a single intermediate frequency stage in a circuit for demodulating the two-dimensional data symbols transmitted by the carrier-based data transmission.
Figure 13:
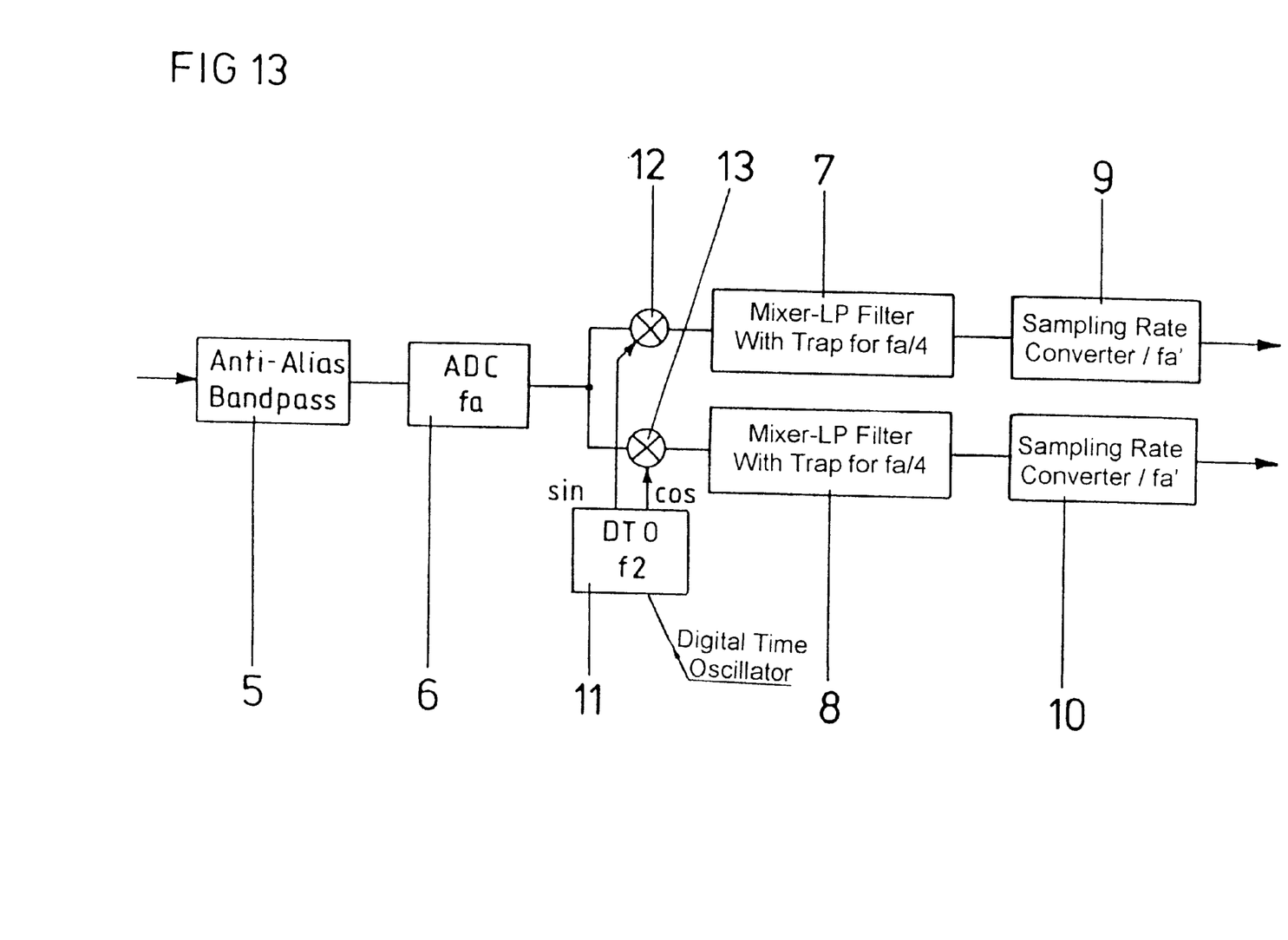
FIG. 13 is a block diagram of an embodiment of the digital quadrature demodulator in a circuit, containing the tuner shown in FIG. 12, for demodulating the two-dimensional data symbols transmitted by carrier-based data transmission with direct sampling of the single intermediate frequency.

In the future, progress in analog/digital converter technology will allow receiver configurations using direct sampling of a single intermediate frequency of the tuner. A tuner and quadrature demodulator suitable for this purpose are shown in FIGS. 12 and 13, where circuit components corresponding to the tuner in FIG. 2 and to the quadrature demodulator in FIG. 2 are denoted by the same reference symbols. There is therefore no need for any explanation of identical circuit components. FIG. 12 additionally shows an AGC circuit 14 at the output of the tuner. In FIG. 13, the anti-alias element 5 is a bandpass filter instead of a low-pass filter and the first intermediate frequency stage in FIG. 12 uses a mixer frequency fm+/−f1. In accordance with FIG. 10, the mixer low-pass filters 7, 8 are configured with a trap at fa/4. This technology eliminates the problems of oscillator crosstalk in tuners having two intermediate frequency stages. However, it is still necessary to prevent the harmful effects of the DC component (see FIG. 8). On the basis of the present invention, it is evident that the result of the selection fa=4/5*f1 or fa=6/5*f1 is that the DC component is shifted to fa/4 again and is suppressed there by the modified mixer low-pass filter (see FIG. 9). The selection fa=4/5*fa also results in that the whole digital demodulator circuit shown in FIG. 1 and FIG. 2 can be adopted unchanged, only the anti-alias low-pass filter needing to be replaced by an anti-alias bandpass filter (see FIG. 13).

I claim:

1. A circuit for demodulating two-dimensional data symbols transmitted by a carrier-based data transmission, comprising:

a tuner having a first intermediate frequency stage for converting a carrier frequency of a reception-side input signal containing the two-dimensional data symbols to a first intermediate frequency f1, a surface wave filter connected downstream of said first intermediate frequency stage, and a second intermediate frequency stage for converting the carrier frequency of the input signal to a second intermediate frequency f2 being lower than the first intermediate frequency f1 and connected downstream of said surface wave filter; and a quadrature demodulator connected downstream of said tuner and converting the input signal at the second carrier intermediate frequency f2 to a baseband and splitting the input signal into in-phase and quadrature components, said quadrature demodulator having an A/D converter with a prescribed sampling frequency fa and an anti-alias filter connected upstream of said A/D converter for removing interfering spectral components, the first intermediate frequency f1, the second intermediate frequency f2 and the sampling frequency fa being approximately defined by one of:

f2=f1/5 and fa=4·f2; and f2=f1/5 and fa=4/5·f1.

2. The circuit according to claim 1, wherein said anti-alias filter is a filter selected from the group consisting of low-pass filters and bandpass filters.

3. The circuit according to claim 1, wherein said quadrature demodulator has a removal device for removing a frequency fa/4 and connected downstream of said A/D converter.

4. The circuit according to claim 3, wherein said removal device has a mixer low-pass filter configuration with a frequency trap at fa/4.

5. The circuit according to claim 3, wherein said removal device has a mixer low-pass filter configuration with a zero.

6. The circuit according to claim 1, wherein said quadrature demodulator has a mixer low-pass filter configuration connected downstream of said A/D converter and a sampling rate converter with a low-pass filter connected downstream of said mixer low-pass filter configuration.

7. A circuit for demodulating two-dimensional data symbols transmitted by a carrier-based data transmission, comprising:

a tuner having a first intermediate frequency stage for converting a carrier frequency of a reception-side input signal containing the two-dimensional data symbols to a first intermediate frequency f1, a surface wave filter connected downstream of said first intermediate frequency stage, and a second intermediate frequency stage for converting the carrier frequency of the input signal to a second intermediate frequency f2 being lower than the first intermediate frequency f1 and connected downstream of said surface wave filter; and a quadrature demodulator connected downstream of said tuner and converting the input signal at the second carrier intermediate frequency f2 to a baseband and splitting the input signal into in-phase and quadrature components, said quadrature demodulator having an A/D converter with a prescribed sampling frequency fa and an anti-alias filter connected upstream of said A/D converter for removing interfering spectral components, the first intermediate frequency f1 and the sampling frequency fa being approximately defined by one of:

fa=4/5·f1; and fa=6/5·f1.

8. The circuit according to claim 7, wherein said anti-alias filter is a filter selected from the group consisting of low-pass filters and bandpass filters.

9. The circuit according to claim 7, wherein said quadrature demodulator has a removal device for removing a frequency fa/4 and connected downstream of said A/D converter.

10. The circuit according to claim 9, wherein said removal device has a mixer low-pass filter configuration with a frequency trap at fa/4.

11. The circuit according to claim 9, wherein said removal device has a mixer low-pass filter configuration with a zero.

12. The circuit according to claim 7, wherein said quadrature demodulator has a mixer low-pass filter configuration connected downstream of said A/D converter and a sampling rate converter with a low-pass filter connected downstream of said mixer low-pass filter configuration.

* * * * *